(12) United States Patent
Burkett et al.

(10) Patent No.: US 6,678,889 B1
(45) Date of Patent: Jan. 13, 2004

(54) SYSTEMS, METHODS AND COMPUTER PROGRAM PRODUCTS FOR LOCATING RESOURCES WITHIN AN XML DOCUMENT DEFINING A CONSOLE FOR MANAGING MULTIPLE APPLICATION PROGRAMS

(75) Inventors: Charles Edward Burkett, Chapel Hill, NC (US); David Bruce Lection, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/566,015

(22) Filed: May 5, 2000

(51) Int. Cl.[7] .............................. G06F 9/00; G06F 9/44; G06F 17/00; G06F 17/24
(52) U.S. Cl. ........................ 718/104; 715/513; 717/114; 707/103 R; 707/100; 707/103 Y; 718/100; 718/102
(58) Field of Search ................................ 717/100, 114; 700/1, 100, 102, 104, 107–108; 707/10, 100, 100 R, 100 Z, 100 Y

(56) References Cited

U.S. PATENT DOCUMENTS

| | | | |
|---|---|---|---|
| 5,121,477 A | 6/1992 | Koopmans et al. | 395/156 |
| 5,404,441 A | 4/1995 | Satoyama | 395/155 |
| 5,418,941 A | 5/1995 | Peters | 395/575 |
| 5,487,145 A | 1/1996 | Marsh et al. | 395/162 |
| 5,548,704 A | 8/1996 | Steiner et al. | 395/158 |
| 5,668,959 A | 9/1997 | Malcolm | 345/333 |
| 5,696,914 A | 12/1997 | Nahaboo et al. | 395/333 |
| 5,781,739 A | 7/1998 | Bach et al. | 395/200.57 |
| 5,848,410 A | 12/1998 | Walls et al. | 707/4 |
| 5,877,766 A | 3/1999 | Bates et al. | 345/357 |
| 5,878,418 A | 3/1999 | Polcyn et al. | 707/10 |
| 6,237,005 B1 * | 5/2001 | Griffin | 707/102 |
| 6,449,615 B1 * | 9/2002 | Liu et al. | 707/10 |
| 6,594,355 B1 * | 7/2003 | Deo et al. | 379/219 |
| 2002/0147696 A1 * | 10/2002 | Acker et al. | 707/1 |
| 2003/0014421 A1 * | 1/2003 | Jung | 707/102 |

FOREIGN PATENT DOCUMENTS

| | | |
|---|---|---|
| EP | 336560 A | 10/1989 |
| EP | 541236 A | 5/1993 |
| JP | 08166865 A | 6/1996 |
| JP | 09198348 A | 7/1997 |
| JP | 10-187512 | 7/1998 |
| WO | WO9502236 A | 1/1995 |

OTHER PUBLICATIONS

Specification, Extensible Markup Language (XML) 1.0, prepared by W3C XML Working Group (WG), pp. 1–32 (Feb. 10, 1998).

(List continued on next page.)

*Primary Examiner*—Majid A. Banankhah
*Assistant Examiner*—Syed Ali
(74) *Attorney, Agent, or Firm*—Myers Bigel Sibley & Sajovec; Jeanine S. Ray-Yarletts

(57) ABSTRACT

Systems, methods and computer program products are provided for sharing resources within an Extensible Markup Language (XML) document that defines a console (i.e., a graphical user interface or GUI) for managing a plurality of application programs and tasks associated therewith. Upon receiving a user request to perform a task associated with an application program managed by a console, resource containers at each scoping level within the XML document are searched for one or more resources required to perform the task. A search is initiated at the scoping level where a task to be performed is defined and proceeds in ascending order towards the root scoping level until the resource is located. When found, a clone of each located resource is generated. The task is then performed using the clone of the resource. The clone of the resource may be discarded after the task has been performed.

13 Claims, 13 Drawing Sheets

OTHER PUBLICATIONS

Muschett, B.H. et al., "Dynamic Loading of Locale Specific Hyper Text markup Language (HTML) Pages," Research Disclosure, International Business Machines Corporation (Mar. 1998).

Farn, B., "Method to Convert Graphical User Interface Definitions and Windows to HyperText Markup Language," IBM Technical Disclosure Bulletin, vol. 40, No. 08, pp. 167–173 (Aug. 1997).

Elder, B. et al., "Architecture for Platform and Presentation Independent User Interface for Applications," IBM Technical Disclosure Bulletin, vol. 38, No. 01, pp. 167–173 (Jan. 1995).

Jern, M., Conference Paper, "Information visualization on the Web," Abstract, 1998 IEEE Conference on Information Visualization, London UK (Jul. 1998).

Berg, D., "An Internet Solution," Abstract, Object Magazine, vol. 7, No. 3 (May 1997).

Suzuki, T. et al., "Multimedia HTML Layout Method," Abstract, IEICE Transactions on Communications, vol. E79-B, No. 8 (Aug. 1996).

Gray, M.. et al., "Coupling application design and user interface design," Abstract, CHI '92 Conference Proceedings ACM Conference on Human Factors in Computing Systems Striking a Balance (1992).

Makela, R. et al., "Keep it simple–interactive electronic applications with SGML," Abstract, SGML Europe '97 Conference Proceedings (May 1997).

Flammia, G., "SMIL makes Web applications multimodal," Abstract, IEEE Intelligent Systems, vol. 13, No. 4 (Jul.–Aug. 1998).

de Baar, DJMJ et al., "Coupling application design and user interface design," Abstract, CHI '92 Conference Proceedings, ACM Conference on Human Factors in Computing Systems, Striking a Balance (1992).

"AUIML /a Language for Marking–up Intent–based User Interfaces," IBM Corporation (copyright 1998–2000).

"C3 Toolkit Developer's Guide," Release 1.0, IBM Corporation (copyright 1999).

* cited by examiner

FIG. 7

```
<DATA-GROUP ID="NameAddress">

<GROUP ID="FullName">                          72a
    <STRING ID="LastName">
      <VALUE>Smith</VALUE>
    </STRING>
    <STRING TYPE="STRING" ID="FirstName"/>
  </GROUP>

<GROUP ID="MailAddress">        72b
    <STRING ID="Street"/>
    <STRING ID="City"/>
    <STRING ID="Province"/>
    <STRING ID="PostalCode"/>
  </GROUP>

</DATA-GROUP>
```

FIG. 8

```
<DATA-GROUP>
 <GROUP>
   <DATA-ITEM>
   <DATA-ITEM>        74
   <DATA-ITEM>
   <DATA-ITEM>
  </GROUP
 </DATA-GROUP>
```

FIG. 14

```
<DATA-GROUP NAME="User">
 <GROUP NAME="FullName">
  <STRING NAME="LastName"/>                    ← 94a
  <STRING NAME="FirstName"/>
  <STRING NAME="MiddleName"/>
 </GROUP>                                          94b
</DATA-GROUP>

<DATA-GROUP NAME="NotesUser" INHERIT-FROM="User">
 <STRING NAME="NotesID"/>
</DATA-GROUP>
```

SYSTEMS, METHODS AND COMPUTER PROGRAM PRODUCTS FOR LOCATING RESOURCES WITHIN AN XML DOCUMENT DEFINING A CONSOLE FOR MANAGING MULTIPLE APPLICATION PROGRAMS

FIELD OF THE INVENTION

The present invention relates generally to user interfaces and, more particularly, to user interfaces that support the launching of multiple application programs and tasks shared by users of a computer network.

BACKGROUND OF THE INVENTION

Administrative consoles are being developed to provide a common graphical user interface (GUI) within which users can configure and manage multiple, heterogeneous applications and network resources shared by members of a computer network. Applications and other resources managed via administrative consoles are typically referred to collectively as "products." An exemplary administrative console for managing multiple heterogeneous products is the Microsoft Management Console illustrated in FIG. 1.

Conventionally, each product in an administrative console supplies the resources needed by the respective product. For example, each product in a conventional console may contain the following string values in its own product resource file(s): "Ok", "Cancel", "Next", "Previous", "Help", "Monday", "Tuesday", and "January". These string values may allow a product to perform specific tasks. Each product in a console conventionally retrieves resources from the respective product's own resource file(s). As such, a product conventionally defines resources that are also defined in other products. For example, the task performed when a user activates an "Ok" button displayed within a GUI is typically defined by each product, even though the task may be identical.

It would be highly desirable to reduce duplication of product resources by allowing multiple products within a console to share resources, especially resources that facilitate performance of identical tasks. Unfortunately, tasks of administered products within a console may be "heterogeneous" in that they may be written in different programming languages, may require different runtime support libraries, and may use and manage resources differently. For example, one product within a console may include tasks written in the C++ programming language and may require the C++ runtime library to run within the console. Another product within the same console may have tasks written in Visual Basic and require the Visual Basic runtime library for operation. As such, it may be difficult to share resources between these product's tasks.

SUMMARY OF THE INVENTION

The present invention is directed to systems, methods and computer program products for defining and sharing resources within an Extensible Markup Language (XML) document that defines a console (i.e., a graphical user interface or GUI) for managing a plurality of application programs and tasks associated therewith, and that is task and language independent. An XML document according to an embodiment of the present invention includes a root scoping level and a hierarchical plurality of scoping levels descending from the root scoping level that define application programs and tasks associated therewith. A resource container may be located at the root scoping level and at each scoping level descending from the root scoping level. Each respective resource container contains a definition for at least one respective resource that is utilized by one or more application programs and/or tasks associated with an application program.

Upon receiving a user request to perform a task associated with an application program managed by a console, a search is conducted within containers at each scoping level for one or more resources required to perform the task. The search is initiated at the scoping level where the task to be performed is defined and proceeds in ascending order towards the root scoping level until the resource is located. When found, a clone of each located resource is generated. The task is then performed using the clone of the resource. The clone of the resource may be discarded after the task has been performed. The "original" of the resource is not modified.

According to other embodiments of the present invention, a cloned resource may be modified such that performance of a task is altered. For example, a "TEMPLATE" modifier according to an embodiment of the present invention permits portions of resources to be reused, both within a resource and within other resources that have scope to the referenced resource (i.e., that are authorized according to the scoping hierarchy to utilize the resource). An "ALIAS" modifier according to an embodiment of the present invention allows a resource definition to be an alias of another resource definition that is in scope. An "INHERIT-FROM" modifier according to another embodiment of the present invention allows a resource definition to inherit from another resource definition that is in scope.

Resource searching according to the present invention may reduce duplication of resources utilized by multiple products. Accordingly, cost savings may be realized because of the reduced amount of code associated with multiple application programs.

BRIEF DESCRIPTION OF THE DRAWINGS

FIG. 7 illustrates exemplary XML markup tags for defining a data group having multiple hierarchically ordered groups.

FIG. 8 illustrates the use of <DATA-TYPE></DATA-TYPE> markup tags to declare data items.

FIG. 14 illustrates an "INHERIT-FROM" modifier that allows a resource definition to inherit from another resource definition that is in scope.

DETAILED DESCRIPTION OF THE INVENTION

Figure 1:
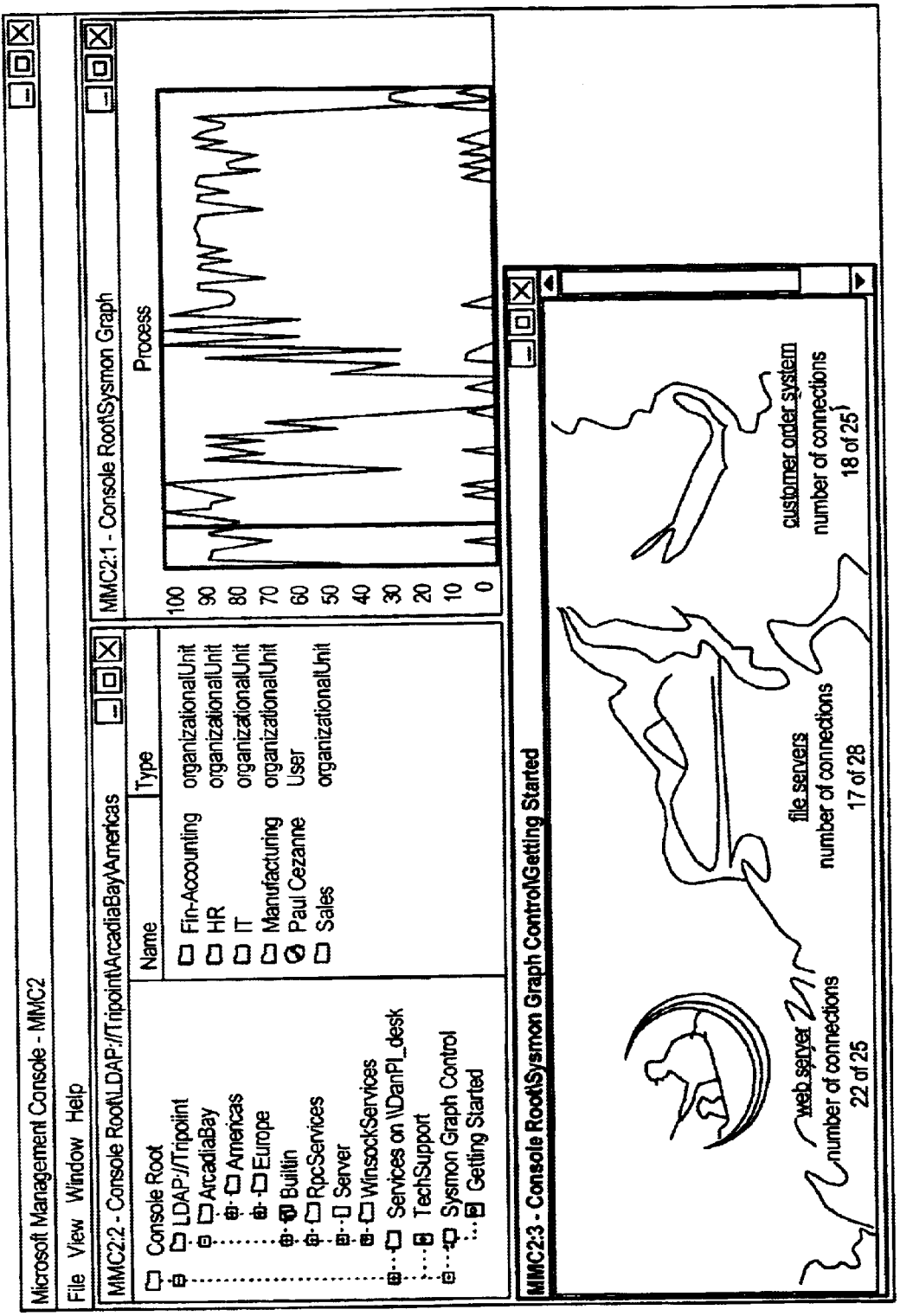
FIG. 1 illustrates a conventional administrative console for managing multiple application programs.

The present invention now is described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

HyperText Markup Language (HTML)

HTML utilizes various tags that control format attributes and that identify different portions of a document (i.e., <tag_name> text</tag_name>). Tags are conventionally denoted by the "< >" symbols, with the actual tag between the brackets. Most markup language tags have an opening tag "<tag>" and a closing tag "</tag>." A tag is a singular entity that opens or closes an element. For instance, the <P> HTML tag opens a paragraph element. Likewise, the </P> HTML tag closes a paragraph element. These two tags, plus the content between them, represent the HTML element. A tag is only part of an element, not the element itself. The HTML language is described in the HTML Reference Manual, Jan. 2, 1996, published by Sandia National Laboratories, which is incorporated herein by reference, in its entirety.

Extensible Markup Language (XML)

Extensible Markup Language (XML) is currently a formal recommendation from the World Wide Web Consortium as a way to make the Web a more versatile tool. XML syntax guidelines and the definition of XML entities are presented in the Extensible Markup Language (XML) 1.0 Specification, Feb. 10, 1998, which is incorporated herein by reference in its entirety and which is available at http://www.w3.org/TR/1998/REC-xml-19980210.

XML is similar to HTML in that both languages are subsets of Standard Generalized Markup Language (SGML) and that both utilize tags to describe the contents of a page or file. HTML, however, describes the content of a Web page (mainly text and graphic images) only in terms of how content is displayed and interacted with. XML describes the content in terms of what data is being described. For example, a <PHONENUM> tag could indicate that the data following the tag is a phone number. This means that an XML file can be processed purely as data by a program or it can be stored with similar data on another computer or, like an HTML file, that it can be displayed. For example, depending on how the application program in the receiving computer wanted to handle the phone number, it could be stored, displayed, or dialed. XML is "extensible" because, unlike HTML, XML markup tags can be unlimited and can be self-defining.

The structure of an XML document is essentially a tree. The root element is the top-level element, and its descendants (i.e., the other elements) branch out from there. XML parsers are applications that examine XML code and report forming errors. An XML parser reads XML files, generates a hierarchically structured tree, herein referred to as a Document Object Model Tree ("DOM Tree"), and then hands off data to viewers and other applications for processing.

Document Type Definitions (DTDs) may accompany an XML document, essentially defining the rules of the XML document, such as which elements are present and the structural relationship between the elements. DTDs can help validate data when a receiving application does not have a built-in description of the incoming XML data. With XML, however, DTDs are optional.

As will be appreciated by one of skill in the art, the present invention may be embodied as a method, data processing system, or computer program product. Accordingly, the present invention may take the form of an entirely hardware embodiment, an entirely software embodiment or an embodiment combining software and hardware aspects. Furthermore, the present invention may take the form of a computer program product on a computer-usable storage medium having computer-usable program code means embodied in the medium. Any suitable computer readable medium may be utilized including hard disks, CD-ROMs, optical storage devices, or magnetic storage devices.

Computer program code for carrying out operations of the present invention, and a console in particular, is preferably written in the JAVA® programming language. In addition all resource definitions are preferably defined using XML. Both JAVA® and XML are portable and available on many operating environments, so the preferred embodiment provides a portable platform, which provides resource portability between tasks that run in the platform.

However, the computer program code for carrying out operations of the present invention may also be written in other object-oriented programming languages as well as in conventional procedural programming languages, such as the "C" programming language, or functional (or fourth generation) programming languages such as Lisp, PASCAL, or Forth may also be utilized. The program code for carrying out operations of the present invention may execute entirely on one or more data processors.

JAVA® is an object-oriented programming language developed by Sun Microsystems, Mountain View, Calif. JAVA® is a portable and architecturally neutral language. JAVA® source code is compiled into a machine-independent format that can be run on any machine with a JAVA® runtime system known as the JAVA® Virtual Machine (JVM). The JVM is defined as an imaginary machine that is implemented by emulating a processor through the use of software on a real machine. Accordingly machines running under diverse operating systems, including UNIX®, Windows 95®, Windows NT®, and MacIntosh® having a JVM can execute the same JAVA® program.

The present invention is described below with reference to block diagram and/or flowchart illustrations of methods, apparatus (systems) and computer program products according to an embodiment of the invention. It is understood that each block of the block diagram and/or flowchart illustrations, and combinations of blocks in the block diagram and/or flowchart illustrations, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions specified in the block diagram and/or flowchart block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the block diagram and/or flowchart block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block diagram and/or flowchart block or blocks.

Administrative Consoles

Figure 2:
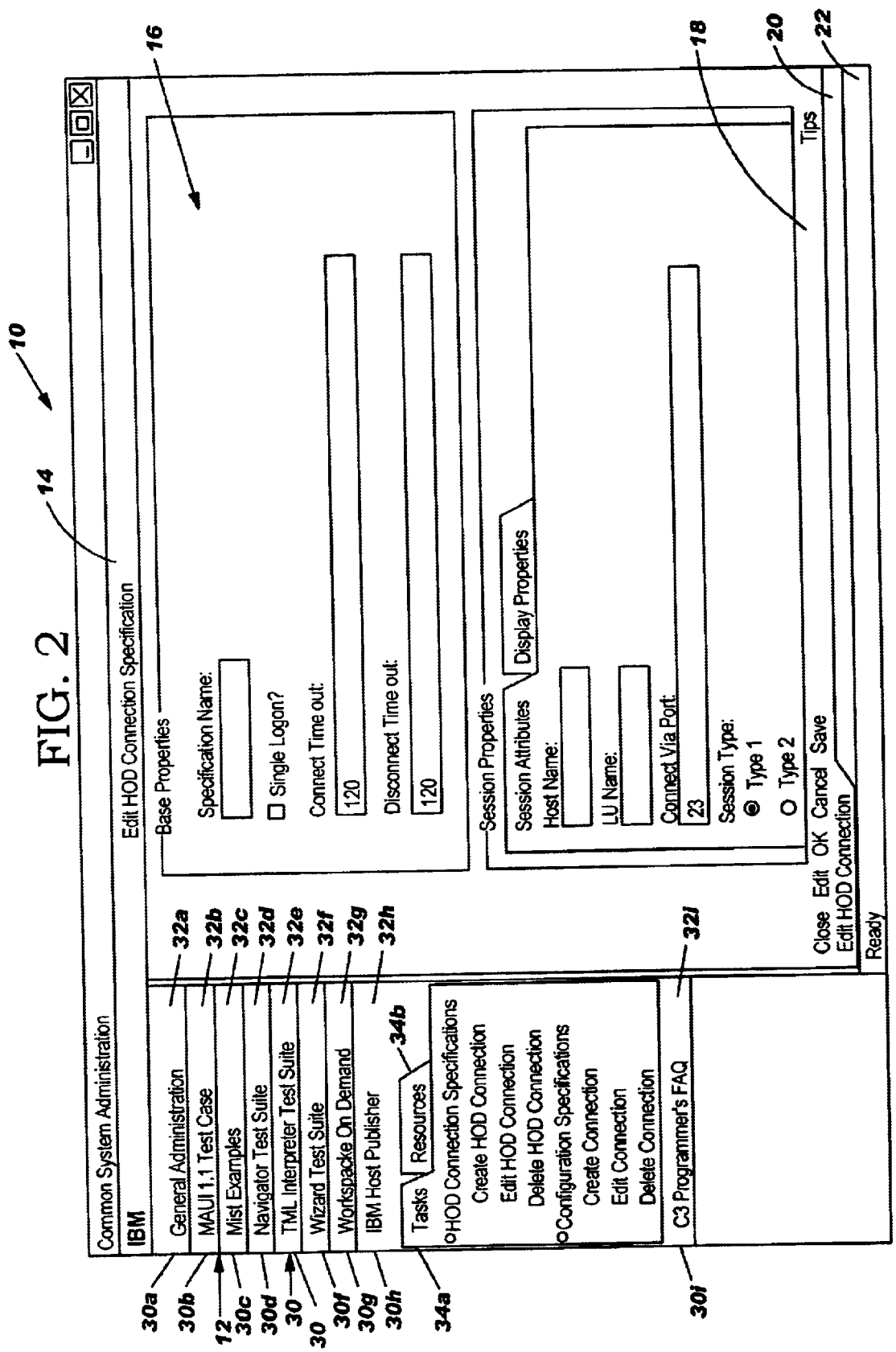
FIG. 2 illustrates an administrative console for managing multiple application programs that is defined by an XML document according to an embodiment of the present invention.

Referring now to FIG. 2, an administrative console 10 for managing multiple heterogeneous application programs or products according to an embodiment of the present invention is illustrated. The illustrated console 10 is defined by an Extensible Markup Language (XML) document, written in the Console Markup Language (CML). Products and their associated tasks are managed via the console 10. The illustrated console 10 includes six parts: the Navigator area 12, the Title area 14, the Content area 16, the Action area 18, the Task Switcher area 20, and the Message area 22. The Navigator area 12 contains all of the categories (i.e., products), tasks, and resources.

The products 30 within the illustrated console 10 include: General Administration 30a; MAUI 1.1 Test Cases 30b; Misc. Examples 30c; Navigator Test Suite 30d; TML Interpreter Test Suite 30e; Wizard Test Suite 30f; Workspace On Demand 30g; IBM Host Publisher 30h; and C3 Programmer's FAQ 30i. Each of the products 30 in the illustrated console 10 is presented as a respective drawer (32a–32i) in the Navigator area 12 of the console 10. Each of the products 30 has a hierarchical list of administrative tasks and a hierarchical list of resources associated therewith. In the illustrated console 10, the drawer 32h for the product IBM Host Publisher 30h is open and the hierarchical lists of administrative tasks 34a, and resources 34b are displayed.

CML is a language that defines how a console, such as the illustrated console 10, will be displayed. Using CML, the illustrated console 10 can be started with the Navigator area 12 open or closed, the Navigator area 12 aligned to the left side or the right side, and with a logon screen or a homepage. CML can also be used to specify which categories, tasks, and resources will appear in the Navigator area 12. CML is described in detail in the "C3 Toolkit Developer's Guide", Release 1.0, available from the International Business Machines Corporation, Armonk, N.Y., and which is incorporated herein by reference in its entirety. XML vocabularies intended to facilitate the definition of a user interface according to the present invention are described in "AUIML, A Language for Marking-up Intent-based User Interfaces" by Roland A. Merrick, available from the International Business Machines Corporation, Armonk, N.Y., and which is incorporated herein by reference in its entirety.

Figure 3A:
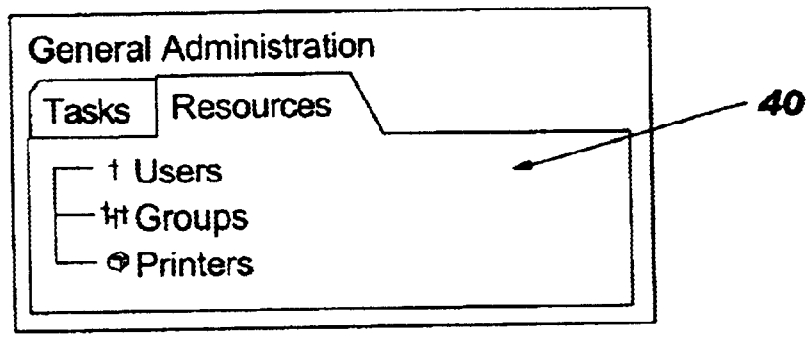
FIGS. 3A–3B illustrate a listing of resources and tasks, respectively, that are available via the illustrated console of FIG. 2.
Figure 3B:
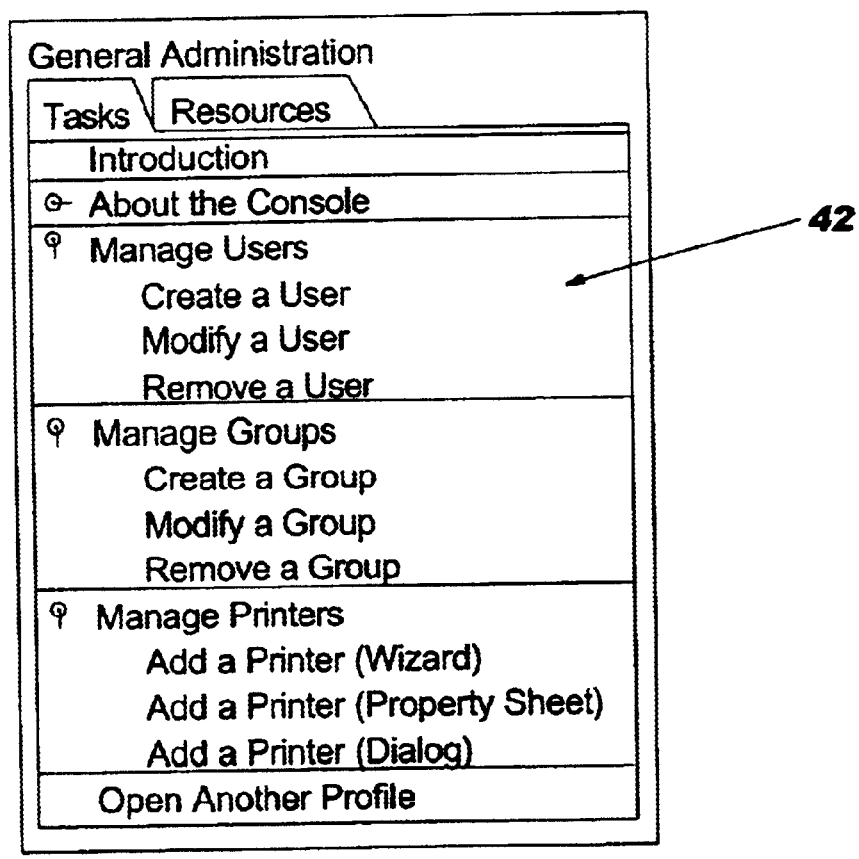

As used herein, the term "resources" is defined to mean objects and the term "tasks" is defined to mean executable units of work. For example, in FIG. 3A, resources 40 are the objects (users, groups, and printers). FIG. 3B illustrates tasks 42 which are the actions that can be performed upon the resources 40 (i.e., create a user, modify a user, remove a user, and the like).

Figure 4:
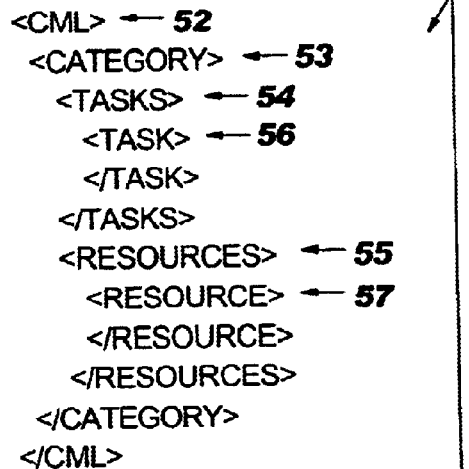
FIG. 4 illustrates a four-level scoping hierarchy for the XML document that defines the console of FIG. 2.

The contents of the illustrated console 10 are described in an XML document using a four-level CML listing 50 as illustrated in FIG. 4. Each level is referred to as a "scoping level." The <CML> tag 52 is the root tag (i.e., the first scoping level tag) of the document and contains definitions of resources for the entire console 10. The <CATEGORY> tag 53 is a second scoping level tag and defines the resources and tasks for a specific product (e.g., IBM Host Publisher 12h. Each <CATEGORY> tag in an XML document according to the present invention is a "descendent" from the root tag 52. It is noted that only one <CATEGORY> tag 53 is illustrated in FIG. 4. However, it is to be understood that multiple <CATEGORY> tags may descend from the root tag 52.

Figure 5:
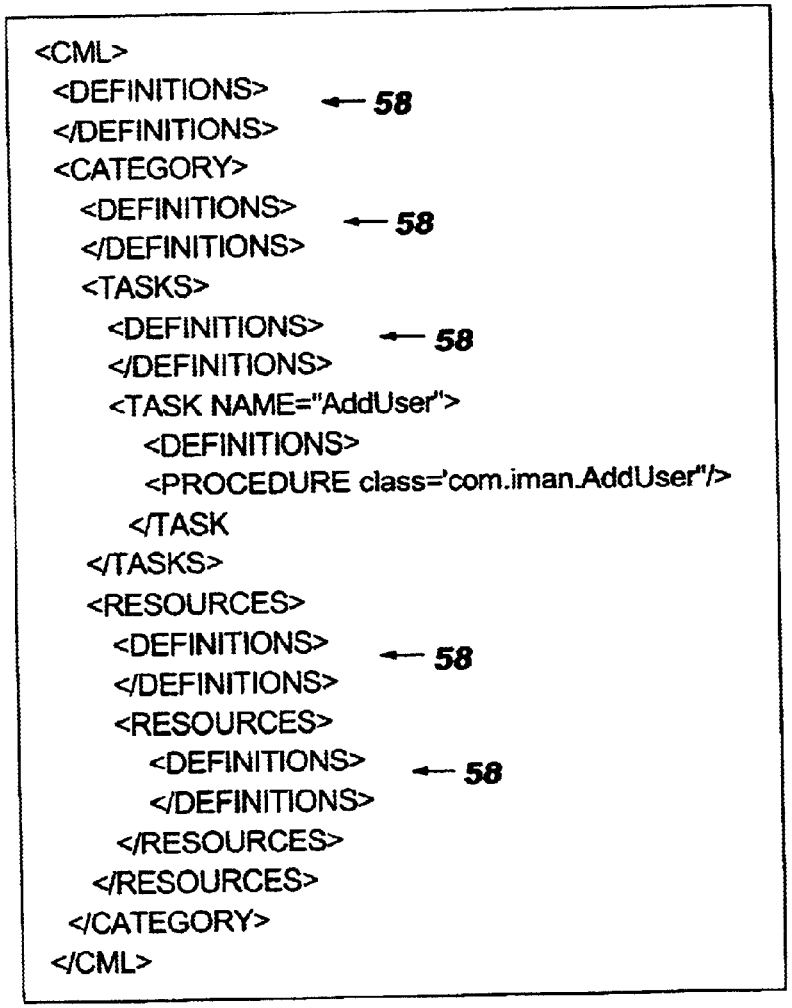
FIG. 5 illustrates <DEFINITIONS> sub-tags that may be contained within each of the four scoping level tags of FIG. 4.
Figure 6:
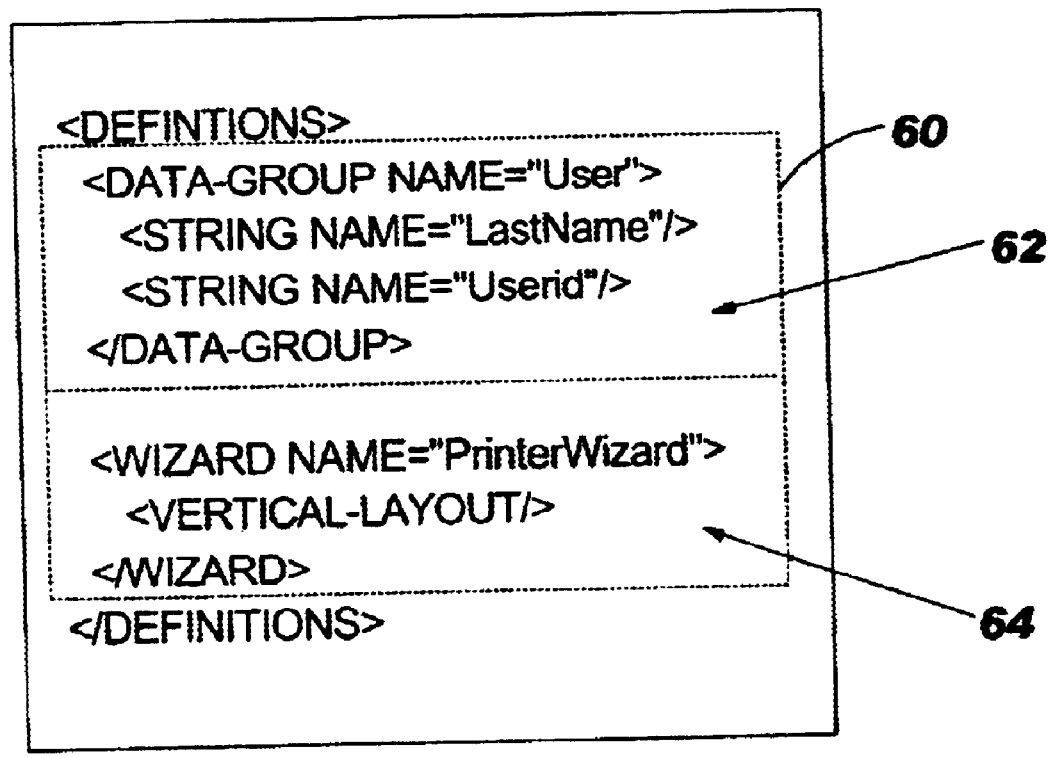
FIG. 6 illustrates resource containers that may be included within each set of <DEFINITIONS></DEFINITIONS> sub-tags of the XML document that defines the console of FIG. 2.

The <TASKS> and <RESOURCES> tags 54, 55 are third scoping level tags and contain hierarchical lists of tasks and resources. The individual <TASK> and <RESOURCE> tags 56, 57 are fourth scoping level tags. Each of the four scoping levels of tags, thus, defines four scoping levels: "CONSOLE", "CATEGORY", "TASKS", and "TASK". In addition, each of the four scoping level tags 52–57 may contain <DEFINITIONS></DEFINITIONS> sub-tags 58 as illustrated in FIG. 5. Each set of <DEFINITIONS></DEFINITIONS> sub-tags 58 defines a "resource container" 60 of declared data in XML as illustrated in FIG. 6. The illustrated resource container 60 includes a DATA-GROUP 62 and a WIZARD 64.

An XML DATA-GROUP is defined by hierarchically ordering one or more XML data items therewithin. FIG. 7 illustrates an exemplary DATA-GROUP definition 70 including multiple hierarchically ordered aggregations of data (hereinafter "groups") 72a, 72b. As illustrated in FIG. 7, the outermost XML markup tags in the DATA-GROUP definition 70 are the <DATA-GROUP></DATA-GROUP> markup tags. These <DATA-GROUP></DATA-GROUP> markup tags establish the outermost containment of the group(s) of data to be displayed.

Hierarchically ordered groups within a data group are identified by <GROUP></GROUP> markup tags. Groups may be independent of each other or may be nested within other groups. Each group within a DATA-GROUP contains specific XML data items in hierarchical order. Each data item is declared using <DATA-ITEM></DATA-ITEM> markup tags 74 as illustrated in FIG. 8. Exemplary data item types, including elementary, compound, and complex data items that may be declared, are listed below in TABLE 1.

TABLE 1

Data Item Types

| | |
|---|---|
| <STRING> | A string is a collection of characters. |
| <NUMBER> | A number is any valid numeric expression of the form "characteristic.fraction". |
| <BOOLEAN> | A boolean data item contains either a true value or a false value. |
| <DATE> | Any valid data expression in a subset of ISO 8601 format (yyyy-mm-dd). |
| <TIME> | Any valid data expression in a subset of ISO 8601 format (hh-mm-ss). |
| <TCP-IP ADDRESS> | A compound data type that stores a TCP-IP formatted numeric address. |
| <NETWORK-NAME> | A compound data type that can be resolved by host name or DNS to a TCP-IP address. |
| <TELEPHONE NUMBER> | A compound data type that can be used to address a device on PSTN. |
| <RICH TEXT> | A compound data type that contains text, text formatting and special embedded tags to do linking. |
| <IMAGE> | A complex data type that stores a bit stream that is rendered as a visual image. |
| <AUDIO> | A complex data type that stores a bit stream that is rendered as a sound. |
| <VIDEO> | A complex data type that stores a bit stream that is rendered as a video sequence. |
| <BIT-STREAM> | A complex data type that stores a contiguous stream of binary data. |

It is understood that TABLE 1 does not contain an exhaustive listing of data types. Various other data types may be utilized in accordance with the present invention. Data groups are further described in co-pending, co-assigned U.S. patent application Ser. No. 09/321,700 entitled "Systems, Methods And Computer Program Products For Building And Displaying Dynamic Graphical User Interfaces", which is incorporated herein by reference in its entirety.

FIG. 7 also illustrates an exemplary WIZARD definition 72. As is known to those of skill in the art, an XML WIZARD is configured to ask a user various questions and then utilize the user's responses to perform one or more functions. WIZARDS are typically used in conjunction with an application program to help a user perform a particular task within the application program. For example, a "letter wizard" within a word processing application program may be configured to lead a user through the various steps of producing different types of letters.

Figure 9:
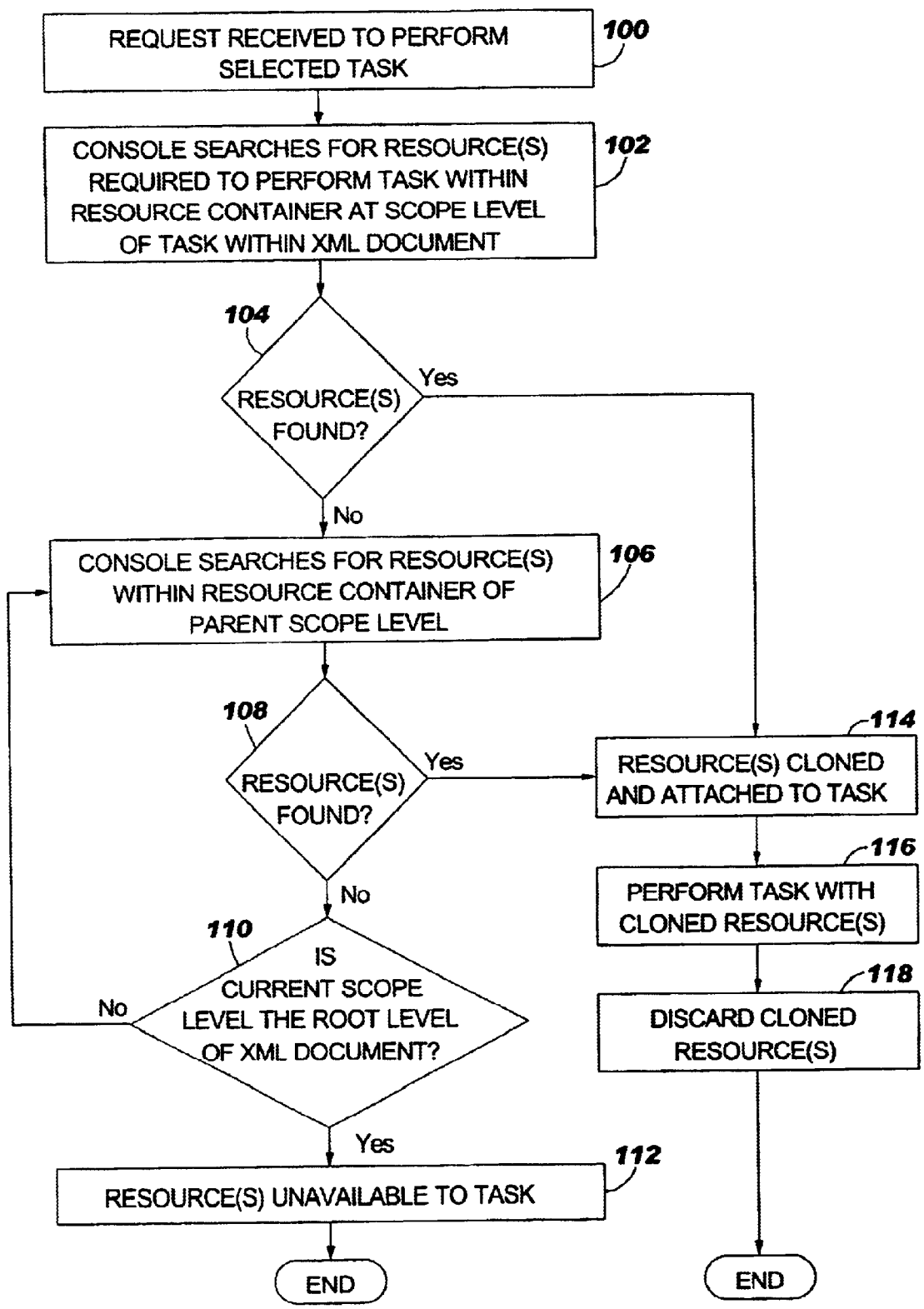
FIG. 9 illustrates operations for locating resources within an XML document for an administrative console, according to an embodiment of the present invention.

Referring now to FIG. 9, operations for locating resources within an XML document that defines a console for managing multiple heterogeneous products, according to an embodiment of the present invention, are illustrated. Initially, a request is received by the console to perform a task (Block 100). The request may be made in response to some action, such as a mouse click. The task references one or more resources required to perform the task and the console searches for the resource(s) required to perform the task within the resource container (i.e., within <DEFINITIONS> </DEFINITIONS> subtags) at the scope level of the requested task within the XML console document (Block 102). For example, the console looks at all resources within the resource container (if one exists) at the current scope level tags (i.e., between the <TASK></TASK> tags) and determines if the resource exists at the current scope level. Resources are preferably identified by "name" and "type". For example, a resource illustrated in FIG. 6 is a DATA-GROUP type with the name "User".

If the resource(s) is found (Block 104), the resource(s) is "cloned" (i.e., a copy of the resource(s) is made and stored in temporary memory) and attached to the task (Block 114). The term "attaching" means that the task has a pointer or reference to the cloned resource. The task may then modify this cloned resource to any need, without affecting the original resource. The task is then performed with the cloned resource(s) (Block 116). The task may then use and modify the cloned resource as needed without changing the original resource. The cloned resource may then be discarded after the task has been performed (Block 118).

If the resource(s) is not found (Block 104), the console searches for the resource(s) within the resource container (i.e., within <DEFINITIONS></DEFINITIONS> subtags) of the parent scope level of the previous scope level (Block 106). If the resource(s) is found (Block 108), the resource(s) is cloned and attached to the task (Block 114). The task is then performed with the cloned resource(s) (Block 116). The cloned resource may then be discarded after the task has been performed (Block 118).

If the resource(s) is not found (Block 108), a determination is made whether the current scope level is the root level of the XML document that defines the console (Block 110). If the current scope level is not the root level of the XML document that defines the console, the console searches for the resource(s) within the resource container (i.e., within <DEFINITIONS></DEFINITIONS> subtags) of the parent scope level of the previous scope level (Block 106). If the current scope level is the root level of the XML document that defines the console, the resource(s) is unavailable to the task (Block 112) and operations end. Also, an error message may be returned.

Operations represented by Block 106—Block 110 are iteratively performed as described above until either the resource(s) is located or the root element of the XML document that defines the console is reached and the resource(s) is not found.

It is noted that a parent scope level tag is not necessarily the immediate hierarchical scope level tag of the current scope level tag, but, rather, is the next ancestor scope level tag which contains <DEFINITIONS></DEFINITIONS> sub-tags. When the next parent scope level tag is located, the console reads the list of declared resources therewithin looking for a match for "name" and "type". This process continues up the hierarchical tree of the XML document until a resource is either found or until there are no more parent scope level tags. If a resource is not found, an appropriate error message is generated.

It is noted that a search moves up the parentage of a document tree, and not down. Accordingly, the present invention prevents a task from retrieving a resource that is not in the task's immediate hierarchical parentage. This protects the resources of a task from discovery by a sibling task, or a task in another product.

Because resource searches according to the present invention move up the parentage of a document tree, a product may place resource declarations within a resource container at the product scoping level. When resources are placed here, they may be seen and accessed by all tasks of a product. In addition, the present invention may allow console-level definitions of resources such that resources may become globally available to all products of a console and to all tasks within the products of a console.

The present invention allows tasks within a product and products within a console to make resources available to other tasks and products in the console. Furthermore, the present invention allows tasks and products to share resources with other tasks and products on a need-to-know basis. For example, a console may choose to share several strings (i.e., resources) of the following nature: "Ok", "Cancel", "Next", "Previous", "Help", "Monday", "Tuesday", and "January". These resources can be declared in a DATA-GROUP in the resource container (i.e., within the <DEFINITIONS></DEFINITIONS> sub-tags) at the console level within an XML document. By locating these resources at the console level within an XML document, all other tasks and products within the console can have access to them. This may reduce the expense of each product supplying these resources in its own product resource file(s) and having the resources separately translated.

The present invention is not limited to the above-described resources. Other resources including, but not limited to, visual layouts (i.e., wizard, panel, tabbed) may be placed within a resource container at the console level within an XML document. Each task can then reference these layouts and can, thus, have a common look and feel.

Figure 10:
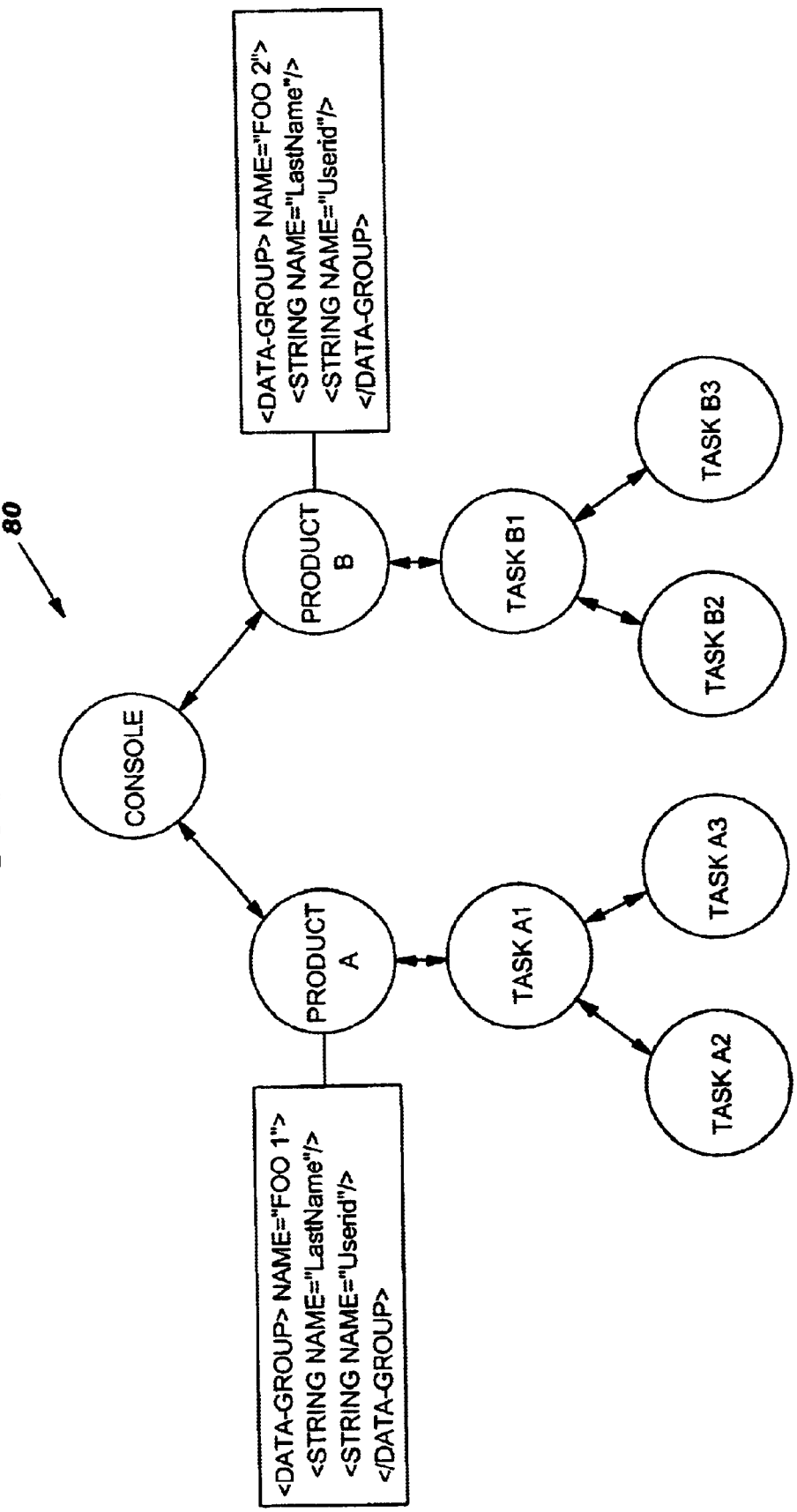
FIG. 10 illustrates the structure of an XML document in hierarchical tree format that can be searched in accordance with the present invention, and wherein two branches for respective products extend from a root scoping level.

Referring now to FIG. 10, the structure of an XML document 80 for defining a console is illustrated in hierarchical tree format for two products. The root element "CONSOLE" represents the first scoping level tag 52 (<CML> tag) of FIG. 4. The elements "PRODUCT A" and "PRODUCT B" are products within the console and represent the second scoping level tag 53 (<CATEGORY> tag) of FIG. 4. The elements "TASK A1" and "TASK B1" are tasks performed by respective products "PRODUCT A" and "PRODUCT B" and represent the third scoping level tag 54 (<TASK> tag) of FIG. 4. The elements "TASK A2" and "TASK A3" are sub-tasks performed within or by "PRODUCT A" and represent the fourth scoping level tag 56 (<TASKS> tag) of FIG. 4. Similarly, the elements "TASK B2" and "TASK B3" are sub-tasks performed within or by "PRODUCT B" and represent the fourth scoping level tag 56 (<TASKS> tag) of FIG. 4.

As described above, each scoping level tag may include a resource container having resources defined therein via <DEFINITIONS></DEFINITIONS> sub-tags. In the illustrated example of FIG. 10, a DATA-GROUP resource named "FOO 1" is defined in a resource container at the second scoping level tag (i.e., at the <CATEGORY> tag) for "PRODUCT A". Also, a DATA-GROUP resource named "FOO 2" is defined in a resource container at the second scoping level tag (i.e., at the <CATEGORY> tag) for "PRODUCT B".

For illustrative purposes, it is assumed that "TASK A2" requires the resource "FOO 1" to execute, and "TASK B3" requires the resource "FOO 2" to execute. When the console represented by the XML document tree 80 of FIG. 10, wants to perform "TASK A2" (e.g., in response to a mouse click by a user), the console looks for a definition of "FOO 1" at the fourth scoping level tag (i.e., within <DEFINITIONS></DEFINITIONS> subtags at the "TASK A2" level). Not finding a definition of "FOO 1" at the fourth scoping level, the search moves up the tree and looks for a definition of "FOO 1" at the third scoping level tag (i.e., within <DEFINITIONS></DEFINITIONS> subtags at the "TASK A1" level). Not finding a definition of "FOO 1" at the third scoping level, the search moves up the tree and looks for a definition of "FOO 1" at the second scoping level tag (i.e., within <DEFINITIONS></DEFINITIONS> subtags at the "PRODUCT A" level).

The console finds a definition of "FOO 1" at the second scoping level tag (i.e., within the <DEFINITIONS></DEFINITIONS> subtags at the "PRODUCT A" level). A copy of the resource "FOO 1" is then cloned and attached to "TASK A2". The clone of the resource "FOO 1" is utilized during execution of "TASK A2" and then discarded. No change is made to the original resource "FOO 1" at the second scoping level tag. "FOO 1" is referred to as "in scope" to all tasks at scoping levels descending from the second scoping level.

Still referring to FIG. 10, for illustrative purposes, it is assumed that "TASK A2" requires the resource "FOO 2" to execute. When the console represented by the XML document tree 80 of FIG. 10 wants to execute "TASK A2" (e.g., in response to a mouse click by a user), the console looks for a definition of "FOO 2" at the fourth scoping level tag (i.e., within <DEFINITIONS></DEFINITIONS> subtags at the "TASK A2" level). Not finding a definition of "FOO 2" at the fourth scoping level, the search moves up the tree looking for a definition of the resource "FOO 2" at the third, second, and first scoping levels. Not finding a definition of "FOO 2" at any scoping level, an error message is returned.

Although a definition of "FOO 2" is located at the second scoping level tag for "PRODUCT B", the console will not allow resources to be copied from another branch that extends from the root element "CONSOLE" (i.e., the first scoping level). Accordingly, resources can be selectively hidden from various products and tasks in a console according to the present invention.

Figure 11:
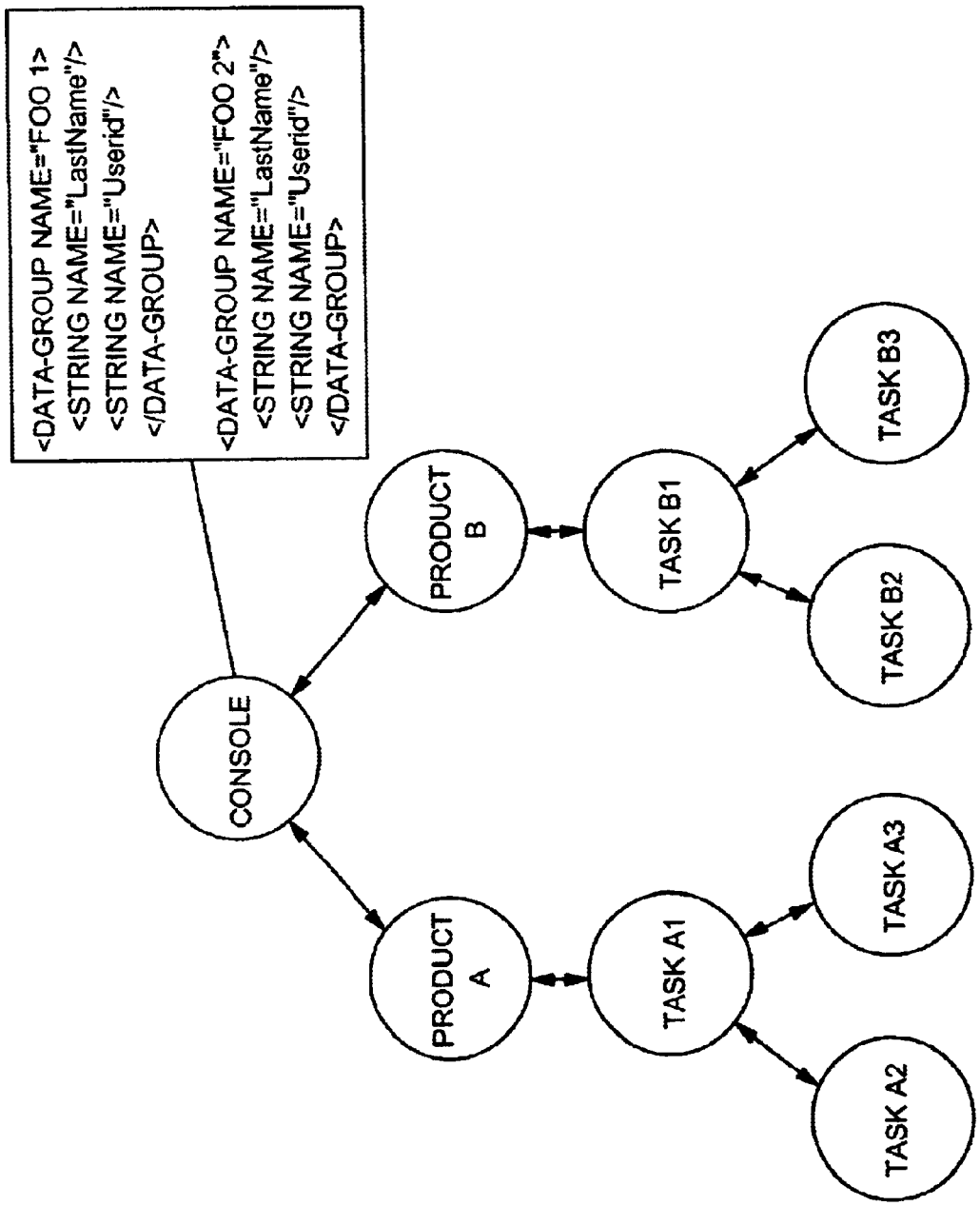
FIG. 11 illustrates the XML document structure of FIG. 10 with the resources "FOO 1" and "FOO 2" both defined at the root element "CONSOLE" (i.e., at the <CML> tag) for the console.

Referring now to FIG. 11, the resources "FOO 1" and "FOO 2" are both defined at the root element "CONSOLE" (i.e., at the <CML> tag) for the console XML document 80. As a result, both resources "FOO 1" and "FOO 2" are accessible by all tasks (TASK A1, TASK A2, TASK A3, TASK B1, TASK B2, TASK B3) and each product (PRODUCT A, PRODUCT B).

Figure 12:
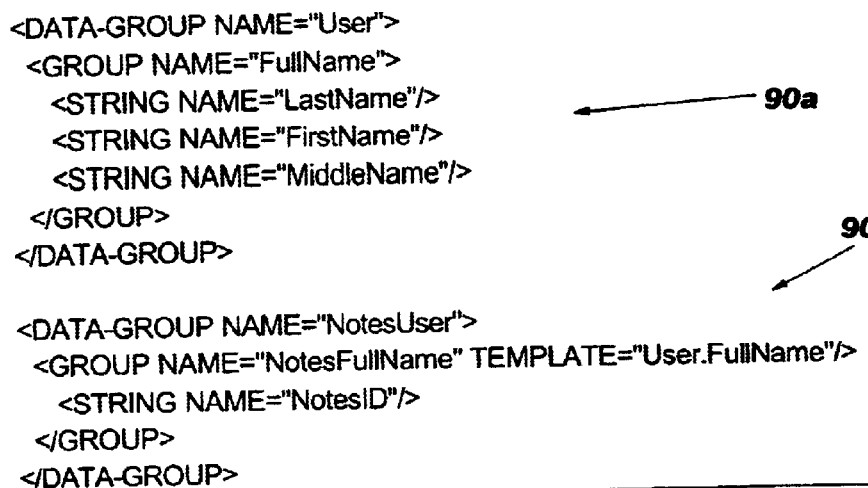
FIG. 12 illustrates a "TEMPLATE" modifier that permits portions of resources to be reused, both within a resource and within other resources that have scope to the referenced resource.

As described above, according to one embodiment of the present invention, the simple name reference of a resource causes a clone of the resource to be created and returned to the requesting task. According to additional embodiments of the present invention, clones of located resources may also be modified in various ways. For example, a "TEMPLATE" modifier permits portions of resources to be reused, both within a resource and within other resources that have scope to the referenced resource. For example, the set of tags illustrated in FIG. 12 creates two DATA-GROUP templates 90a, 90b. The second template "NotesUser" 90b contains a group called "NotesFullName" which was cloned from the group "FullName" in the DATA-GROUP "User" 90a.

Figure 13:
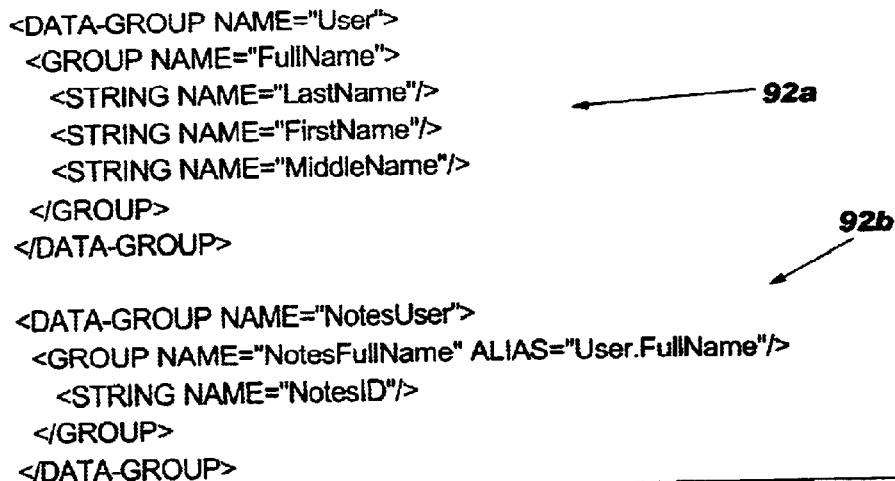
FIG. 13 illustrates an "ALIAS" modifier that allows a resource definition to be an alias of another resource definition that is in scope.

An "ALIAS" modifier allows a resource definition to be an alias of another resource definition that is in scope. For example, the set of tags illustrated in FIG. 13 creates two DATA-GROUP templates 92a, 92b. The second template "NotesUser" 92b contains a group called "NotesFullName" that is an alias of the GROUP "FullName" in the DATA-GROUP "User" 92a. These two GROUPS are actually a single GROUP that is referenced from both DATA-GROUPS.

AN "INHERIT-FROM" modifier allows a resource definition to inherit from another resource definition that is in scope. For example, the set of tags illustrated in FIG. 14 creates two DATA-GROUP templates 94a, 94b. The second template "NotesUser" 94b contains a GROUP called "FullName" that is inherited from and cloned from GROUP "FullName" in the DATA-GROUP "User" 94a. The DATA-GROUP also contains an additional string called "NotesID".

Figure 15:
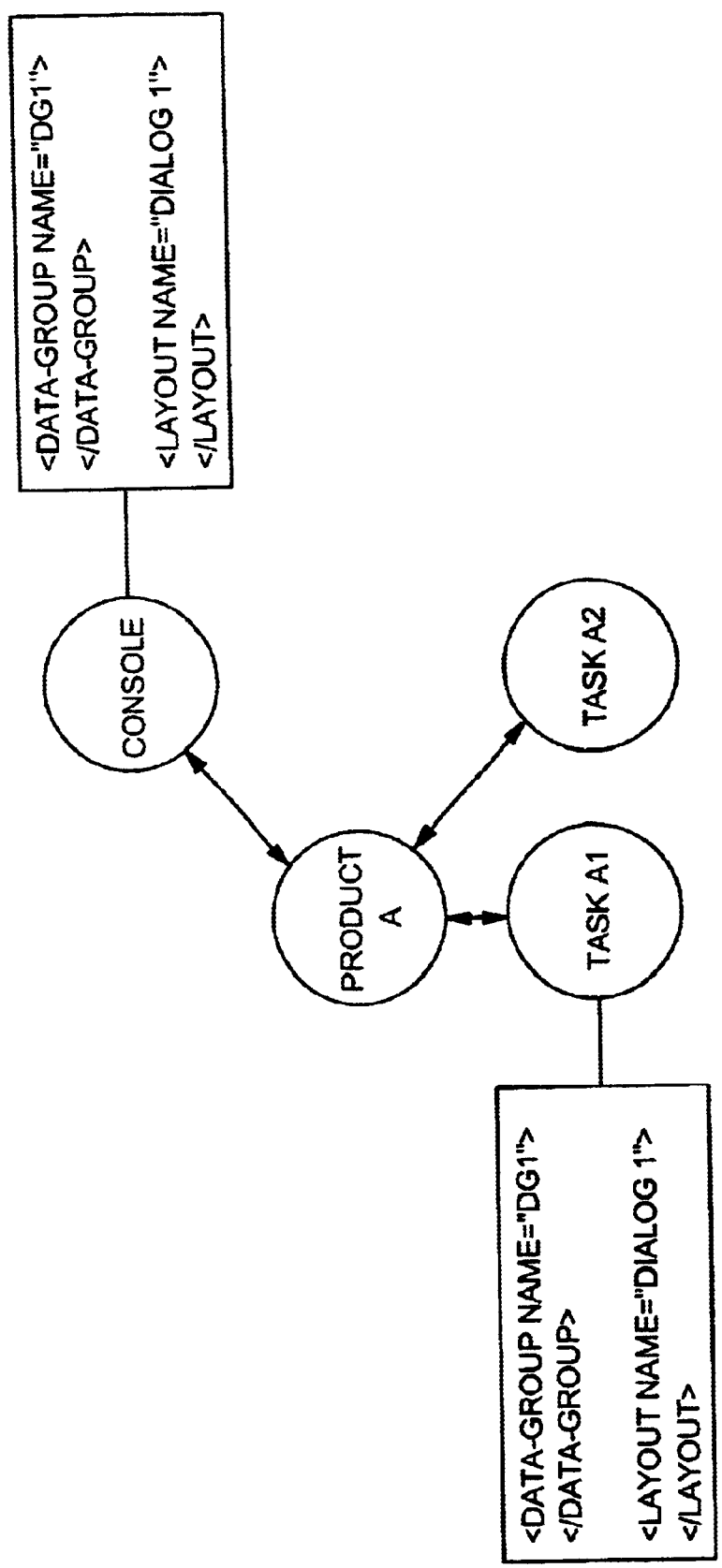
FIG. 15 illustrates the structure of an XML document in hierarchical tree format that can be searched in accordance with another embodiment of the present invention.

According to another embodiment of the present invention, illustrated in FIG. 15, a lower scoping level resource of the same name and type can "hide" a resource at a higher scoping level. In the illustrated example of FIG. 15, a DATA-GROUP resource named "DG 1" and a LAYOUT resource named "DIALOG 1" are defined in a resource container at the first (root) scoping level tag (i.e., at the <CML> tag). Also, a DATA-GROUP resource named "DG 1" and a LAYOUT resource named "DIALOG 1" are defined in a resource container at the scoping level of "TASK A1". No resource container is provided at the scoping level of "TASK A2", as illustrated.

According to the embodiment of the present invention illustrated in FIG. 15, when "TASK A1" is performed, the definition of DG 1 in the resource container at the CONSOLE scoping level is utilized. However, the local scoping level definition (i.e., the definition of DIALOG 1 in the resource container of "TASK A1") of DIALOG 1 is utilized. On the other hand, when "TASK A2" is performed, the definitions of DG 1 and DIALOG 1 in the resource container at the CONSOLE scoping level are utilized.

Figure 16:
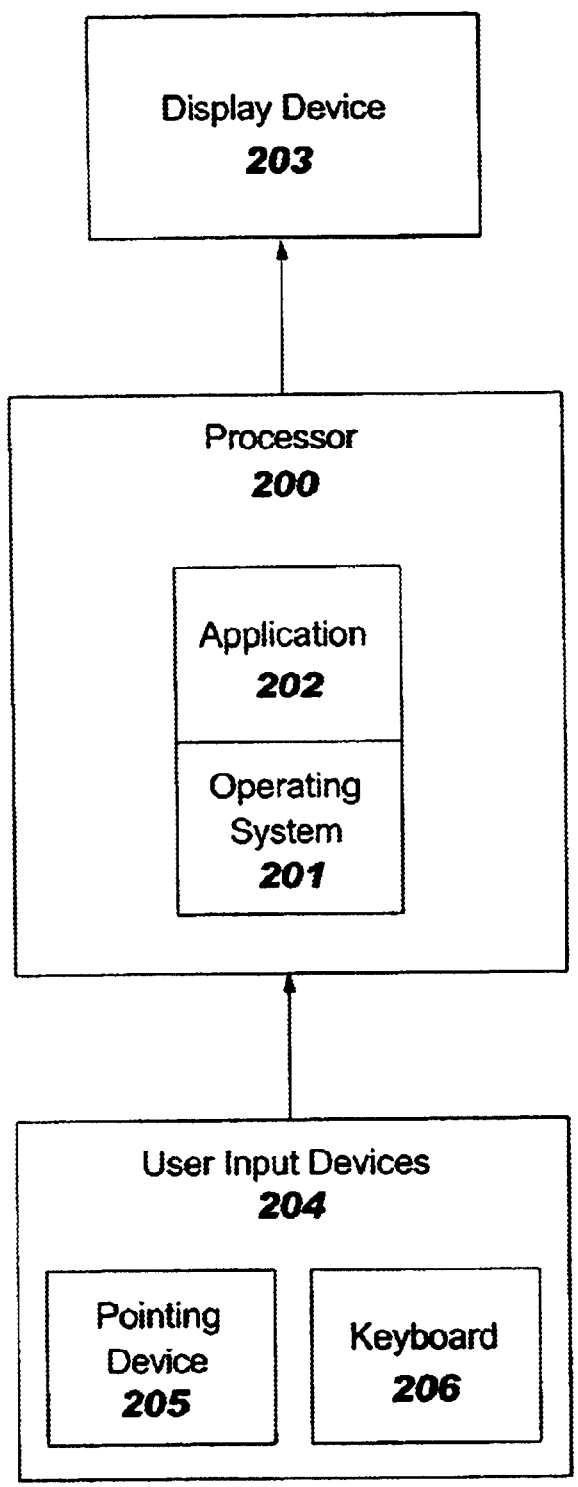
FIG. 16 schematically illustrates a data processing system within which various operations of the present invention may be performed.

FIG. 16 illustrates a data processing system in which the present invention may be utilized. As seen in FIG. 15, a data processor 200 may have an operating system (such as UNIX®, Windows 98®, Windows NT®, and the like) 201 resident therein. An application program 202 may be running on the operating system 201. The processor 200 displays information on a display device 203. The display device 203 has a plurality of picture elements (collectively referred to as a screen) which may define the appearance of a console (or GUI) displayed on the display device 203 pursuant to an XML document according to the present invention. The contents of the screen 203 and, therefore, the appearance of the console, may be controlled or altered by the application program 202 or the operating system 201, either individually or in combination. For obtaining input from a user, the operating system 201, the application program 202, or both, may utilize user input devices 204. User input devices 204 may include a pointing device 205 and a keyboard 206 or other input devices known to those of skill in the art.

Exemplary data processing systems in which the present invention may be utilized include, but are not limited to, Sun Microsystems®, Apple®, IBM®, and IBM®-compatible personal computers and workstations. However, it is to be understood that various computing devices and processors may be utilized to carry out the present invention without being limited to those enumerated herein. Exemplary operating systems within which the present invention may be utilized include, but are not limited to, UNIX®, Windows 98®, Windows 95®, and Windows NT®.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clause are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. A method of sharing resources within an Extensible Markup Language (XML) document that defines a graphical user interface (GUI) for managing a plurality of application programs and tasks associated therewith, wherein the XML document comprises a root scoping level and a hierarchical plurality of scoping levels descending from the root scoping level that define each application program and tasks associated therewith, wherein a resource container may be located at the root scoping level and at each scoping level descending from the root scoping level, and wherein each respective resource container contains a definition for at least one respective resource, the method comprising the following steps performed within a data processing system that displays the GUI:

receiving a user request to perform a task associated with an application program managed by the GUI, wherein the task requires a resource defined within a resource container;

searching resource containers at each scoping level beginning at a scoping level where the task to be performed is defined and proceeding in ascending order towards the root scoping level until the resource is located;

modifying a clone of the located resource with a modifier selected from the group consisting of TEMPLATE, ALIAS, and INHERIT-FROM such that performance of the task is altered; and performing the task using the modified clone of the resource.

2. The method of claim 1 further comprising the step of discarding the clone of the resource after the task has been performed.

3. The method of claim 1 wherein the application programs comprise heterogeneous application programs.

4. A data processing system for sharing resources within an Extensible Markup Language (XML) document that defines a graphical user interface (GUI) for managing a plurality of application programs and tasks associated therewith, wherein the XML document comprises a root scoping level and a hierarchical plurality of scoping levels descending from the root scoping level that define each application program and tasks associated therewith, wherein a resource container may be located at the root scoping level and at each scoping level descending from the root scoping level, and wherein each respective resource container contains a definition for at least one respective resource, comprising:

a display that displays the GUI;

means for receiving a user request to perform a task associated with an application program managed by the displayed GUI, wherein the task requires a resource defined within a resource container;

means for searching resource containers at each scoping level beginning at a scoping level where the task to be performed is defined and proceeding in ascending order towards the root scoping level until the resource is located;

means for modifying a clone of the located resource with a modifier selected from the group consisting of TEMPLATE, ALIAS, and INHERIT-FROM such that performance of the task is altered; and means for performing the task using the modified clone of the resource.

5. The data processing system of claim 4 further comprising means for discarding the clone of the resource after the task has been performed.

6. The data processing system of claim 4 wherein the application programs comprise heterogeneous application programs.

7. A computer program product for sharing resources within an Extensible Markup Language (XML) document that defines a graphical user interface (GUI) for managing a plurality of application programs and tasks associated therewith, wherein the XML document comprises a root scoping level and a hierarchical plurality of scoping levels descending from the root scoping level that define each application program and tasks associated therewith, wherein a resource container may be located at the root scoping level and at each scoping level descending from the root scoping level, and wherein each respective resource container contains a definition for at least one respective resource, the computer program product comprising a computer usable storage medium having computer readable program code embodied in the medium, the computer readable program code comprising:

computer readable program code for receiving a user request to perform a task associated with an application program managed by the displayed GUI, wherein the task requires a resource defined within a resource container;

computer readable program code for searching resource containers at each scoping level beginning at a scoping level where the task to be performed is defined and proceeding in ascending order towards the root scoping level until the resource is located;

computer readable program code for modifying a clone of the located resource with a modifier selected from the group consisting of TEMPLATE, ALIAS, and INHERIT-FROM such that performance of the task is altered; and computer readable program code for performing the task using the modified clone of the resource.

8. The computer program product of claim 7 further comprising computer readable program code for discarding the clone of the resource after the task has been performed.

9. The computer program product of claim 7 wherein the application programs comprise heterogeneous application programs.

10. A method of sharing resources within a Markup Language (ML) document that defines a graphical user interface (GUI) for managing a plurality of application programs and tasks associated therewith, the method comprising the following steps performed within a data processing system that displays the GUI:

providing an ML document that comprises a root scoping level and a hierarchical plurality of scoping levels descending from the root scoping level that define each application program and tasks associated therewith, wherein a resource container is located at at least one of the scoping levels, and wherein each respective resource container contains a definition for at least one respective resource;

receiving a user request to perform a task associated with an application program managed by the GUI, wherein the task requires a resource defined within a resource container;

searching resource containers at each scoping level beginning at a scoping level where the task to be performed is defined and proceeding in ascending order towards the root scoping level until the resource is located; and utilizing the located resource to perform the task, comprising:

modifying a clone of the located resource with a TEMPLATE modifier that permits one or more portions of the cloned resource to be used at a later time; and performing the task using the modified clone of the resource.

11. The method of claim 10 further comprising the step of discarding the clone of the resource after the task has been performed.

12. A method of sharing resources within a Markup Language (ML) document that defines a graphical user interface (GUI) for managing a plurality of application programs and tasks associated therewith, the method comprising the following steps performed within a data processing system that displays the GUI:

providing an ML document that comprises a root scoping level and a hierarchical plurality of scoping levels descending from the root scoping level that define each application program and tasks associated therewith, wherein a resource container is located at at least one of the scoping levels, and wherein each respective resource container contains a definition for at least one respective resource;

receiving a user request to perform a task associated with an application program managed by the GUI, wherein the task requires a resource defined within a resource container;

searching resource containers at each scoping level beginning at a scoping level where the task to be performed is defined and proceeding in ascending order towards the root scoping level until the resource is located; and utilizing the located resource to perform the task, comprising:

modifying a clone of the located resource with an ALIAS modifier that permits the cloned resource to become an alias of another resource definition; and performing the task using the modified clone of the resource.

13. A method of sharing resources within a Markup Language (ML) document that defines a graphical user interface (GUI) for managing a plurality of application programs and tasks associated therewith, the method comprising the following steps performed within a data processing system that displays the GUI:

providing an ML document that comprises a root scoping level and a hierarchical plurality of scoping levels descending from the root scoping level that define each application program and tasks associated therewith, wherein a resource container is located at at least one of the scoping levels, and wherein each respective resource container contains a definition for at least one respective resource;

receiving a user request to perform a task associated with an application program managed by the GUI, wherein the task requires a resource defined within a resource container;

searching resource containers at each scoping level beginning at a scoping level where the task to be performed is defined and proceeding in ascending order towards the root scoping level until the resource is located; and utilizing the located resource to perform the task, comprising:

modifying a clone of the located resource with an INHERIT-FROM modifier that permits the cloned resource to inherit resources from another resource definition; and performing the task using the modified clone of the resource.

\* \* \* \* \*